(No Model.)
C. A. G. SWASEY.
HOLDBACK FOR VEHICLES.
No. 499,447. Patented June 13, 1893.
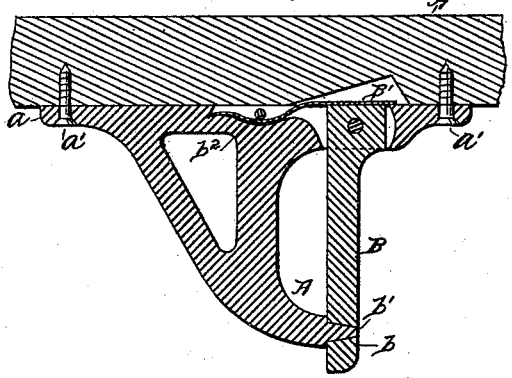
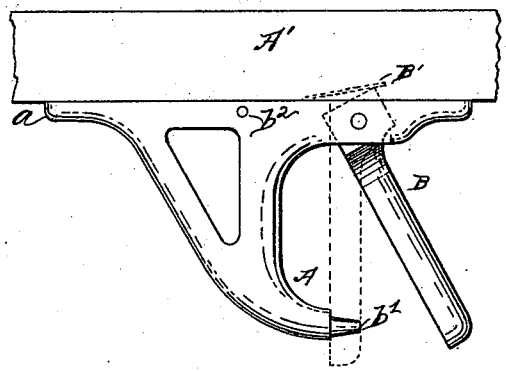
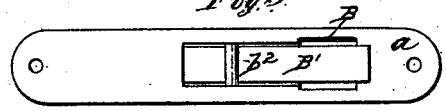
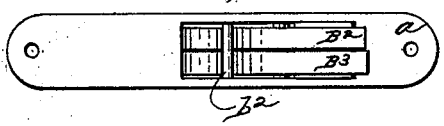
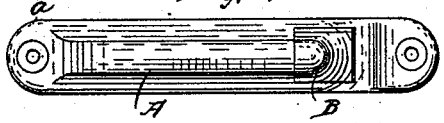
WITNESSES:
INVENTOR
Charles A. G. Swasey.
BY
HIS ATTORNEY

UNITED STATES PATENT OFFICE.

CHARLES A. G. SWASEY, OF NEW BEDFORD, MASSACHUSETTS.

HOLDBACK FOR VEHICLES.

SPECIFICATION forming part of Letters Patent No. 499,447, dated June 13, 1893.

Application filed August 30, 1892. Serial No. 444,596. (No model.)

*To all whom it may concern:*

Be it known that I, CHARLES A. G. SWASEY, of New Bedford, county of Bristol, and State of Massachusetts, have invented a certain new and useful Improvement in Holdback-Hooks, of which the following is a specification.

I will describe a hold back hook embodying my invention and then point out the novel features in a claim.

In the accompanying drawings, Figure 1 is a side view of a hold back hook secured to a thill. Fig. 2, is a vertical section thereof. Fig. 3 is a top view of my invention detached from the thill. Fig. 4 is a bottom or edge view thereof. Fig. 5 shows a modification.

Referring by letter to the drawings, A designates the hold back hook and A' shows a portion of a thill. The hold back hook has a base plate $a$ provided with holes through which screws $a'$ are passed into the thill. It will be seen that the plate $a$ is placed directly upon the surface of the thill so that it is not necessary to cut away a portion of the thill for the accommodation of the plate.

B is a keeper having one end pivoted within an opening in the plate $a$ in such manner that its lower end may be swung toward and from the hook A. The keeper B is provided at its lower end with a hole $b$ within which a stud $b'$ on the hook A engages and prevents any lateral movement of the keeper relatively to the hook, when the keeper is in its normal position. The stud $b'$ and the hole $b$ being conical or tapered as shown, insures the engagement of the stud within the hole. The keeper is retained in its normal position, as shown in Fig. 2, and the dotted line in Fig. 1, by means of a spring B' which is secured at one end within the plate A' of the hook A and at its free end bears upon the upper end of the keeper B. I have shown the spring B' as removably secured within a recess in the top of the plate A' by means of a transverse pin $b^2$. The bottom of the recess beneath the pin $b^2$ is concaved longitudinally and the pin holds a curved portion of the spring snugly in this concaved portion so that the spring cannot be accidentally drawn out of place, and yet it may be easily removed when desired.

In Fig. 5, I have shown two springs, $B^2$ $B^3$, instead of one as shown in the main figures. By employing two springs, should one be broken there will still be one spring to retain the keeper in place.

My invention may be attached to any thills and by its use it is not necessary to unbuckle the breeching strap or hold back strap. The strap may be formed into a loop and engaged around the hook after first moving the keeper away from the hook. Upon releasing the keeper it will be forced to its normal position by its spring.

In case of an accident whereby a horse attached to a vehicle fitted with this improvement would become detached from the vehicle except for the breeching, it is obvious that my improvement would enable him to detach himself at the connection of the breeching with the vehicle by simply pulling forward on the breeching. This would be of vital consequence in many accidents.

Having described my invention, what I claim is—

In a holdback hook, the combination of the hook, the base plate having a recess in its upper side, a portion of the bottom of said recess being concaved longitudinally, a spring having a curved portion seated in said concaved portion, a pin for holding the spring snugly but removably in said concaved portion, and a keeper pivoted to the base plate and held in place by the spring bearing on the upper end of said keeper, substantially as specified.

In testimony whereof I have signed my name to this specification in the presence of two subscribing witnesses.

CHARLES A. G. SWASEY.

Witnesses:
S. O. EDMONDS,
WM. M. ILIFF.